US012241289B2

(12) United States Patent
Woo et al.

(10) Patent No.: US 12,241,289 B2
(45) Date of Patent: Mar. 4, 2025

(54) OPENING AND CLOSING DEVICE FOR GLOVE BOXES

(71) Applicants: HYUNDAI MOTOR COMPANY, Seoul (KR); KIA CORPORATION, Seoul (KR)

(72) Inventors: Jung Hoon Woo, Suwon-si (KR); Kwan Woo Lee, Suwon-si (KR); Sang Ku Hur, Hwaseong-si (KR); Ik Jin Jung, Hwaseong-si (KR); Jin Tae Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 559 days.

(21) Appl. No.: 17/537,836

(22) Filed: Nov. 30, 2021

(65) Prior Publication Data

US 2022/0290472 A1 Sep. 15, 2022

(30) Foreign Application Priority Data

Mar. 12, 2021 (KR) ........................ 10-2021-0032410

(51) Int. Cl.
*E05B 83/30* (2014.01)
*E05C 9/04* (2006.01)

(52) U.S. Cl.
CPC .............. *E05B 83/30* (2013.01); *E05C 9/041* (2013.01); *E05C 9/045* (2013.01)

(58) Field of Classification Search
CPC .......... E05B 83/28; E05B 83/30; E05B 83/32; E05C 9/00; E05C 9/002; E05C 9/04; E05C 9/041042; E05C 9/043; E05C 9/045; E05C 9/1012; E05C 9/14; E05C 9/16; B60R 7/0406; B60R 2011/0005; B60R 2011/0007
See application file for complete search history.

(56) References Cited

U.S. PATENT DOCUMENTS

2004/0189012 A1* 9/2004 Katou ........................ B60R 7/06 292/34
2014/0225379 A1* 8/2014 Fukumoto ............... E05C 9/045 292/40

FOREIGN PATENT DOCUMENTS

EP 2944749 A1 * 11/2015 ............... B60R 7/04
EP 3447219 A1 * 2/2019
KR 10-2049486 A 11/2019

* cited by examiner

*Primary Examiner* — Matthew Troutman
*Assistant Examiner* — Christopher F Callahan
(74) *Attorney, Agent, or Firm* — Morgan, Lewis & Bockius LLP

(57) ABSTRACT

An opening and closing device, which opens and closes a glove box includes a housing coupled to the glove box, a handle rotatably mounted on the housing, a locking unit mounted so as to be movable in directions of releasing the glove box from the dashboard of a vehicle, a link rod configured to connect the handle and the locking unit to each other and to move in a height direction of the locking unit when a user rotates the handle, and an elastic member configured to apply force to the locking unit so that the locking unit is engaged with engaged parts of the dashboard, and the locking unit is movable in a length direction of the locking unit in a state of being interlocked with the link rod so that the locking unit is released from the engaged parts of the dashboard.

9 Claims, 7 Drawing Sheets

OPENING AND CLOSING DEVICE FOR GLOVE BOXES

CROSS-REFERENCE TO RELATED APPLICATION

This application claims the benefit of priority to Korean Patent Application No. 10-2021-0032410 filed on Mar. 12, 2021 in the Korean Intellectual Property Office, the entire contents of which are incorporated herein by reference.

TECHNICAL FIELD

The present disclosure relates to an opening and closing device for glove boxes. More particularly, it relates to an opening and closing device for glove boxes which enables a glove box to be maintained in a closed state in normal times and to be opened when a user pulls a handle.

BACKGROUND

In general, a glove box installed in a vehicle is installed in a region of a dashboard opposite a passenger seat, and thus forms a space to store articles. The glove box is generally installed in the dashboard so as to be rotatable. Recently, vehicles, in which a drawer-type glove box moved in the forward and rearward directions by straight-type rail structures so as to be opened and closed is installed, are increasing in number.

In connection with the conventional glove box having a conventional rotatable opening and closing structure, Korean Patent Registration No. 2049486 (hereinafter referred to as "Cited Reference 1") discloses an electronic opening and closing device for glove boxes.

The electronic opening and closing device for glove boxes of Cited Reference 1 includes a pair of locking rods installed on a glove box and configured to be simultaneously inserted into or separated from a pair of locking recesses depressed in both sides of the inside of a box installation part through coupling ends provided at ends thereof so as to be moved rectilinearly in opposite directions in the state of being interlocked with each other, a magnetic force generator configured to operate the locking rods due to interaction of electromagnetic force with one of the coupling ends provided in a pair so as to lock or unlock the glove box, and a switch unit configured to intermit power supply to the magnetic force generator.

The electronic opening and closing device for glove boxes of Cited Reference 1 improves a sense of operation in opening and closing of the glove box and user inconvenience, and thus accords with vehicle advancement.

However, in the electronic opening and closing device for glove boxes of Cited Reference 1, it is inconvenient for a user to press or touch the switch unit and then to pull the glove box. Further, the electronic opening and closing device for glove boxes requires additional elements, such as the switch unit and the magnetic force generator, compared to a manual opening and closing device for glove boxes. Therefore, the electronic opening and closing device for glove boxes of Cited Reference 1 increases the thickness of the front surface of the glove box.

In the electronic opening and closing device for glove boxes of Cited Reference 1, when the switch unit is pressed, vehicle power is simultaneously applied to a pair of rotary drivers, and thus the coupling ends are rotated such that guide inclined planes of the coupling ends are opposite engaging protrusions of the locking recesses. However, due to characteristics of electric operation devices, application of the vehicle power and rotation of the coupling ends are not capable of being simultaneously performed. That is, due to characteristics of electric operation devices, there is a regular delay time between application of the vehicle power and rotation of the coupling ends. Further, noise, which is specific to electric operation devices, is generated.

The above information disclosed in this Background section is only for enhancement of understanding of the background of the present disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide an opening and closing device for glove boxes which enables a glove box to be maintained in a closed state in normal times and to be opened when a user pulls a handle, reduces the thickness of the front surface of the glove box, and minimizes noise generation.

In one aspect, the present disclosure provides an opening and closing device for opening and closing a glove box The opening and closing device may include a housing coupled to the glove box, a handle rotatably mounted on the housing, a locking unit mounted so as to be movable in directions of releasing the glove box from a dashboard of a vehicle, a link rod configured to connect the handle and the locking unit to each other and to move in a height direction of the locking unit when a user rotates the handle, and an elastic member configured to apply force to the locking unit so that the locking unit is engaged with engaged parts of the dashboard, wherein the locking unit is movable in a length direction of the locking unit in a state of being interlocked with the link rod so that the locking unit is released from the engaged parts of the dashboard.

In a preferred embodiment, the handle may include a rotating unit configured to rotate about a rotating shaft, and a link unit extending from the rotating shaft in a radial direction of the rotating shaft and connected to the link rod.

In another preferred embodiment, the locking unit may include a first locking rod and a second locking rod, and the first locking rod may further include an inclined part located at a position of the first locking rod corresponding to a corresponding one of the engaged parts, and may be configured such that the first locking rod moves in the length direction of the locking unit in response to an upward or downward movement of the link rod.

In still another preferred embodiment, the first locking rod may be mounted on the glove box so as to be movable leftwards and rightwards and include a first rack part, the second locking rod may be mounted on the glove box so as to be movable leftwards and rightwards and include a second rack part, and the locking unit may further include a pinion engaged with the first rack part and the second rack part so as to move the first locking rod and the second locking rod towards opposite sides in the length direction of the locking unit.

In yet another preferred embodiment, the locking unit may include a third locking rod and a fourth locking rod, and an elastic member may be located between proximal ends of the third locking rod and the fourth locking rod and configured to engage distal ends of the third locking rod and the fourth locking rod with the engaged parts of the dashboard.

In still yet another preferred embodiment, a pair of inclined parts may be disposed at a part of the link rod where the third locking rod and the fourth locking rod face each other, and the third locking rod and the fourth locking rod may be moved along the inclined plane in directions, in which the proximal ends of the third locking rod and the fourth locking rod approach each other, in response to upward and downward movement of the link rod so that the distal ends of the third locking rod and the fourth locking rod are separated from the engaged parts.

In a further preferred embodiment, the opening and closing device for glove boxes may further include a guide mounted on the glove box such that the locking unit passes through the guide, and the guide may guide movement of the locking unit in the length direction thereof.

In another further preferred embodiment, the opening and closing device for glove boxes may further include a through hole formed through the locking unit in forward and rearward directions, a pin member inserted into the through hole so as to be slidably movable, and pin holes formed in the guide such that the pin member is inserted thereinto, and, when the vehicle is inclined based on an axis thereof in leftward and rightward directions, the pin member may be slidably moved along the through hole and inserted into a corresponding one of the pin holes.

Other aspects and preferred embodiments of the present disclosure are discussed infra.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
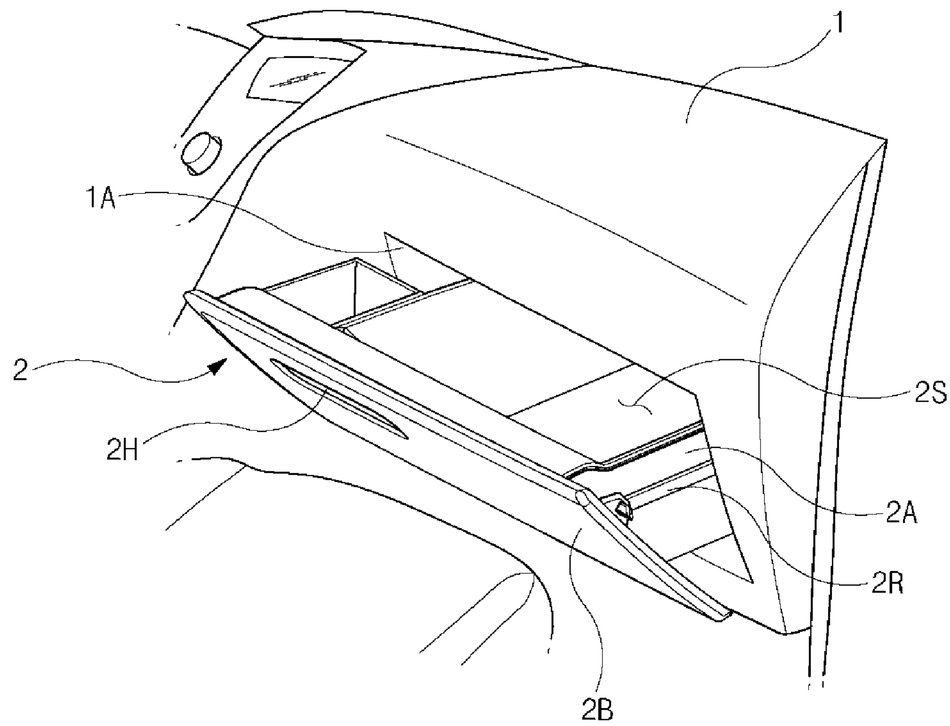
FIG. 1 is a perspective view illustrating the open state of a glove box according to one embodiment of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the present disclosure will be described in conjunction with exemplary embodiments, it will be understood that the present description is not intended to limit the disclosure to the exemplary embodiments. On the contrary, the present disclosure is intended to cover not only the exemplary embodiments, but also various alternatives, modifications, equivalents and other embodiments, which may be included within the spirit and scope of the disclosure as defined by the appended claims. In the following description of the present disclosure, a detailed description of known functions and configurations incorporated herein will be omitted when it may make the subject matter of the present disclosure rather unclear.

An opening and closing device for glove boxes according to the present disclosure enables a glove box to be maintained in a closed state in normal times and to be immediately opened when a user pulls a handle, reduces the thickness of the front surface of the glove box, and minimizes noise generation.

Figure 2:
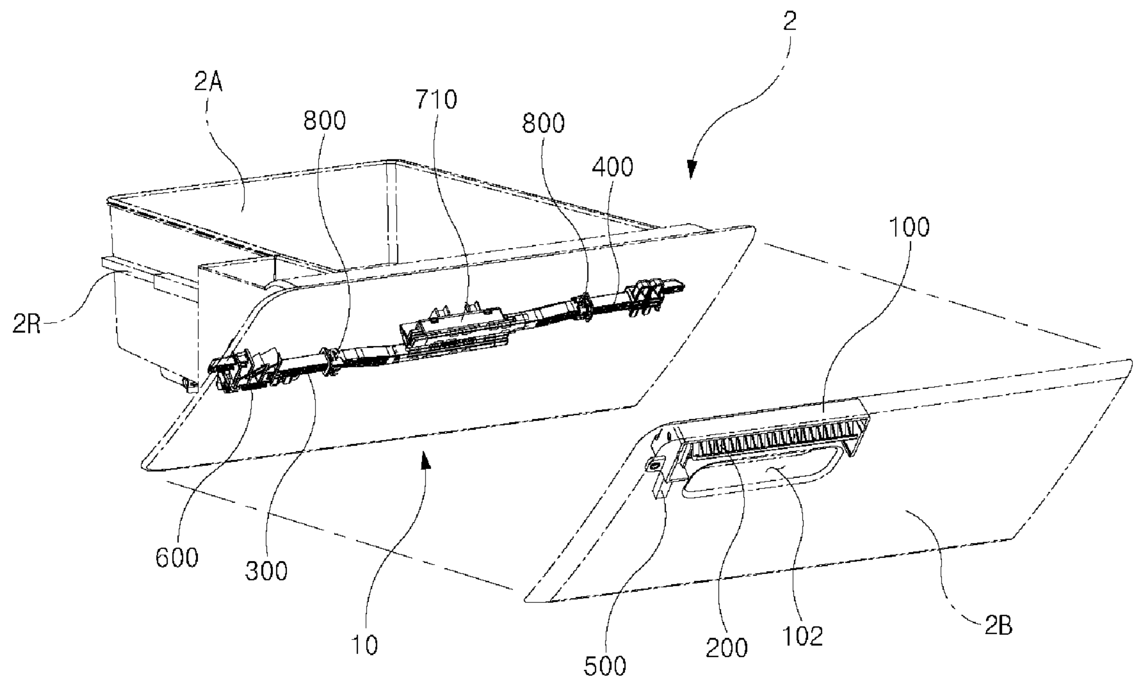
FIG. 2 is a partially exploded perspective view illustrating the installed state of an opening and closing device for glove boxes according to one embodiment of the present disclosure.

FIG. 1 is a perspective view illustrating the open state of a glove box 2 according to one embodiment of the present disclosure, and FIG. 2 is a partially exploded perspective view illustrating the installed state of an opening and closing device 10 for glove boxes according to one embodiment of the present disclosure.

Figure 3:
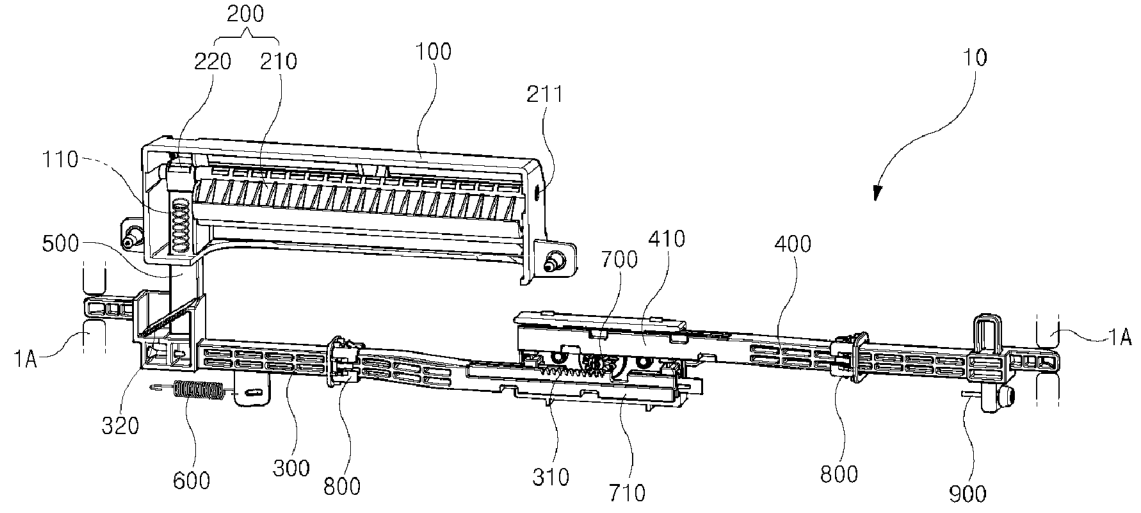
FIG. 3 is a view illustrating the closed state of the glove box by the opening and closing device for glove boxes according to one embodiment of the present disclosure.
Figure 4:
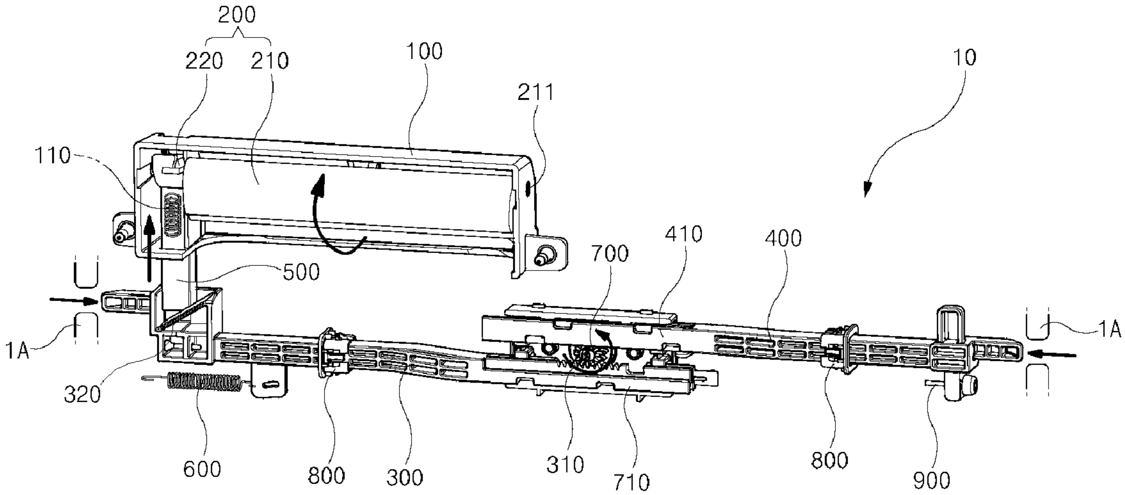
FIG. 4 is a view illustrating the open state of the glove box by the opening and closing device for glove boxes according to one embodiment of the present disclosure.

FIG. 3 is a view illustrating the closed state of the glove box 2 by the opening and closing device 10 for glove boxes according to one embodiment of the present disclosure, and FIG. 4 is a view illustrating the open state of the glove box 2 by the opening and closing device 10 for glove boxes according to one embodiment of the present disclosure.

Hereinafter, for ease in understanding of the present disclosure, a direction in which the glove box 2 is drawn out, i.e., a direction towards a passenger seat, based on FIG. 1 will be referred to as the front. Further, a direction in which the glove box 2 is drawn in, i.e., a direction towards a dashboard 1, based on FIG. 1 will be referred to as the rear.

As shown in FIGS. 1 to 4, the opening and closing device 10 for glove boxes according to one embodiment of the present disclosure enables the glove box 2 to be maintained in a closed state in normal times and to be immediately opened when a user pulls a handle 200.

The opening and closing device 10 for glove boxes according to one embodiment of the present disclosure includes a housing 100, the handle 200, a locking unit, a link rod 500, an elastic member 600, a pinion 700, guides 800 and a subsidiary guide 900. More particularly, the locking unit according to one embodiment of the present disclosure may include a first locking rod 300 and a second locking rod 400.

As shown in FIG. 2, the glove box 2 includes a body 2A and a cover 2B. The opening and closing device 10 for glove boxes according to one embodiment of the present disclosure is provided between the body 2A and the cover 2B.

As show in FIG. 1, the body 2A forms a storage space 2S to store articles. Rails 2R are mounted on the side surfaces of the body 2A. The glove box 2 is mounted in the dashboard 1 of a vehicle so as to be slidably movable in the forward and rearward directions by the rails 2R.

The dashboard 1 of the vehicle may include a box installation part 1A. The box installation part 1A may form a space into which the glove box 2 is drawn. Although not shown in the figures, guide rails (not shown) on which the rails 2R are mounted so as to slidably move thereon may be installed in the box installation part 1A.

As shown in FIG. 2, the cover 2B is coupled to the front surface of the body 2A. The cover 2B may be coupled to the front surface of the body 2A using engagement structures, such as hooks, or by fastening using bolts. A handle groove 102 which is concave is formed in the cover 2B. A user may pull a rotating unit 210 forwards by operating the handle groove 102 with a part of his/her body.

As shown in FIG. 2, the housing 100 is coupled with the rear surface of the cover 2B. The housing 100 may be coupled to the rear surface of the cover 2B using engagement structures, such as hooks, or by fastening using bolts.

As shown in FIG. 3, the handle 200 is mounted on the housing 100 so as to be rotatable. The handle 200 includes the rotating unit 210 and a link unit 220.

A rotating shaft 211 is formed at the rotating unit 210. Holes, into which the rotating shaft 211 is rotatably inserted, are formed through the housing 100.

The rotating unit 210 forms a part which is pulled by the user with his/her hand so as to open the glove box 2. When the user rotates the rotating unit 210, the rotating unit 210 is rotated about the rotating shaft 211 from the state shown in FIG. 3 to the state shown in FIG. 4.

Hereinafter, for ease in understanding of the present disclosure, the state shown in FIG. 3 will be referred to as a closed state. Further, the state shown in FIG. 4 will be referred to as an open state.

The link unit 220 extends from one end of the rotating shaft 211 in the radial direction of the rotating shaft 211. The upper part of the link rod 500 is connected to one end of the link unit 220.

A groove may be formed in the upper part of the link rod 500, and one end of the link unit 220 may be inserted into the groove in the link rod 500. Alternatively, the link rod 500 and the link unit 220 may be rotatably coupled to each other by a pin. Therefore, the link rod 500 may be operated upwards and downwards integrally with the link unit 220, and the link rod 500 may be rotated about one end thereof coupled to the link unit 220 in response to rotation of the rotating unit 210. The link rod 500 is configured to move downwards in the height direction of the glove box 10 in response to rotation of the rotating unit 210 so as to pressurize an inclined part 320 located at the lower end of the link rod 500.

As shown in FIGS. 3 and 4, when the user rotates the rotating unit 210, the link unit 220 is rotated about the rotating shaft 211 from the closed state to the open state. One end of the link unit 220 descends while being rotated from the closed state to the open state. Therefore, the link rod 500 is configured to descend in the state of being interlocked with the link unit 220.

A spring 110 which applies force so as to convert the handle 200 into the closed state may be provided in the housing 100. The upper end of the spring 110 is coupled to the housing 110, and the lower end of the spring 110 is coupled to the link unit 220. Therefore, when the link rod 500 descends in response to rotation of the link unit 220, the spring 110 may be compressed to form tension to push the link unit 220 upwards.

When the user pulls the rotating unit 210 in one direction, the link unit 220 is rotated from the closed state to the open state. At this time, the spring 110 is compressed. When the user takes his/her hand off of the rotating unit 210, the rotating unit 210 is rotated again to the closed state by the restoring force of the spring 110.

As shown in FIGS. 3 and 4, the first locking rod 300 and the second locking rod 400 are configured to be movable in directions of releasing the housing 100 from the dashboard 1. More particularly, the first locking rod 300 and the second locking rod 400 are configured to be movable in the length direction (i.e., the leftward and rightward directions) along the width of the glove box 2. The inclined part 320 is formed at the distal end of the first locking rod 300. The inclined part 320 may be configured such that the height of the inclined part 320 increases as the inclined part 320 approaches the distal end of the first locking rod 300.

Engaged parts are formed on both side surfaces, i.e., the left and right surfaces, of the box installation part 1A. The engaged parts may be configured such that the distal ends of the first locking rod 300 and the second locking rod 400 are inserted into the engaged parts so as to be fixed to the box installation part 1A. More particularly, the engaged parts may be provided as holes into which the distal ends of the first locking rod 300 and the second locking rod 400 are inserted.

As shown in FIG. 3, the closed state means the state in which the left and right ends, i.e., the distal ends, of the first locking rod 300 and the second locking rod 400 are inserted into the engaged parts. As shown in FIG. 4, the open state means the state in which the left and right ends, i.e., the distal ends, of the first locking rod 300 and the second locking rod 400 are released from the engaged parts.

The guides 800 and the subsidiary guide 900 are coupled to the front surface of the body 2A. The guides 800 and the subsidiary guide 900 may be coupled to the front surface of the body 2A using engagement structures, such as hooks, or screw combination structures. More particularly, at least a pair of guides 800 may be provided.

One guide 800 of the pair of guides 800 has a hole through which the first locking rod 300 passes. Therefore, one guide 800 guides leftward and rightward movement of the first locking rod 300 through the inner surface of the hole thereof. The other guide 800 of the pair of guides 800 has a hole through which the second locking rod 400 passes. Therefore, the other guide 800 guides leftward and rightward movement of the second locking rod 400 through the inner surface of the hole thereof.

The subsidiary guide 900 is formed in a pin type. A hole into which the subsidiary guide 900 is inserted the leftward and rightward directions is formed in the second locking rod 400. The second locking rod 400 in the state in which the subsidiary guide 900 is inserted into the hole moves leftwards and rightwards.

As shown in FIGS. 3 and 4, a pinion housing 710 is coupled to the front surface of the body 2A. The pinion housing 710 may be coupled to the front surface of the body 2A using engagement structures, such as hooks, or by fastening using bolts. The pinion 700 is rotatably mounted on the pinion housing 710.

The first locking rod 300 includes a first rack part 310 having gear teeth arranged in a straight line. The second locking rod 400 includes a second rack part 410 having gear teeth arranged in a straight line.

The pinion 700 is simultaneously engaged with the first rack part 310 and the second rack part 410. The first rack part 310 may be engaged with the lower part of the pinion 700. The second rack part 410 may be engaged with the upper part of the pinion 700.

Therefore, when the first locking rod 300 moves in the leftward and rightward directions, the second locking rod 400 also moves in the leftward and rightward directions. The first locking rod 300 and the second locking rod 400 move in opposite directions due to the pinion 700. That is, the first locking rod 300 is configured to move integrally with the second locking rod 400 through rotation of the pinon 700, when the first locking rod 300 moves in the length direction (i.e., the width direction of the glove box 10) in the state of being interlocked with the link rod 500.

A step may be formed at each of the upper and lower parts of the pinion housing 710. The pinion housing 710 may guide leftward and rightward movement of the first locking rod 300 and the second locking rod 400 through the steps.

As shown in FIGS. 3 and 4, the link rod 500 connects the handle 200 and the first locking rod 300 to each other. The upper part of the link rod 500 is connected to one end of the link unit 220.

When the user pulls the rotating unit 210 in one direction, the link unit 220 is rotated about the rotating shaft 211 from the closed state to the open state. One end of the link unit 220 descends while being rotated from the closed state to the open state. Therefore, the link rod 500 is configured to descend in the state of being interlocked with the link unit 220.

An inclined plane is formed on the first locking rod 300. In the closed state, the lower part of the link rod 500 contacts the lowermost part of the inclined plane of the inclined part 32. When the rotating unit 210 is rotated, the link rod 500 descends and applies tension to the inclined plane contacting the lower end of the link rod 500 in the downward direction. The lower part of the link rod 500 descends while sliding on the inclined plane.

The height of the inclined plane decreases with increasing distance from the pinion 700. Further, the first locking rod 300 and the second locking rod 400 are mounted in the glove box 2 so as to be movable leftwards and rightwards.

Therefore, when the link rod 500 descends, the first locking rod 300 and the second locking rod 400 move towards the pinion 700. Then, the left and right ends, i.e., the distal ends, of the first locking rod 300 and the second locking rod 400 are separated from the engaged parts.

The elastic member 600 is configured such that one end thereof is fixed to the body 2A adjacent to a corresponding engaged part, and the other end thereof is coupled to the first locking rod 300 so as to apply elastic force to the first locking rod 300 moved in the length direction. The elastic member 600 may be provided as a coiled spring, and may thus connect the body 2A and the first locking rod 300 to each other.

Therefore, when the user takes his/her hand off of the rotating unit 210, the first locking rod 300 is moved to the original position thereof corresponding to the closed state by the restoring force of the elastic member 600. The second locking rod 400 is moved in the opposite direction to the movement direction of the first locking rod 300 by the pinion 700. Therefore, the second locking rod 400 is also moved to the original position thereof corresponding to the closed state.

Figure 5:
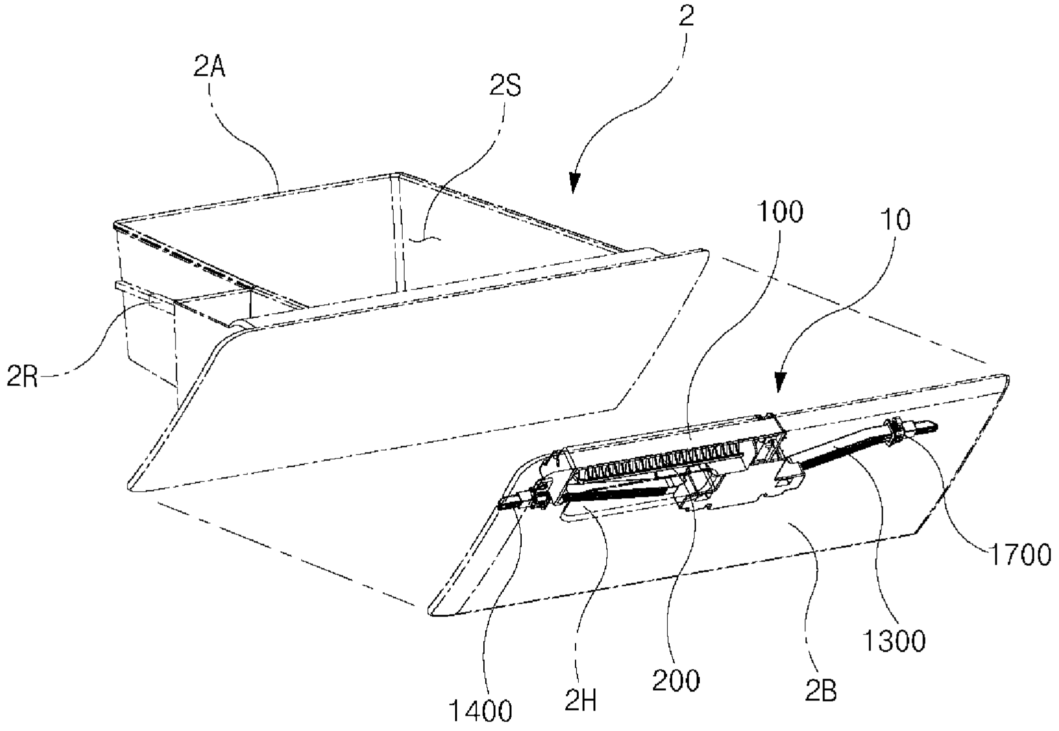
FIG. 5 is a partially exploded perspective view illustrating the installed state of an opening and closing device for glove boxes according to another embodiment of the present disclosure.

FIG. 5 is a partially exploded perspective view illustrating the installed state of an opening and closing device 10 for glove boxes according to another embodiment of the present disclosure.

Figure 6:
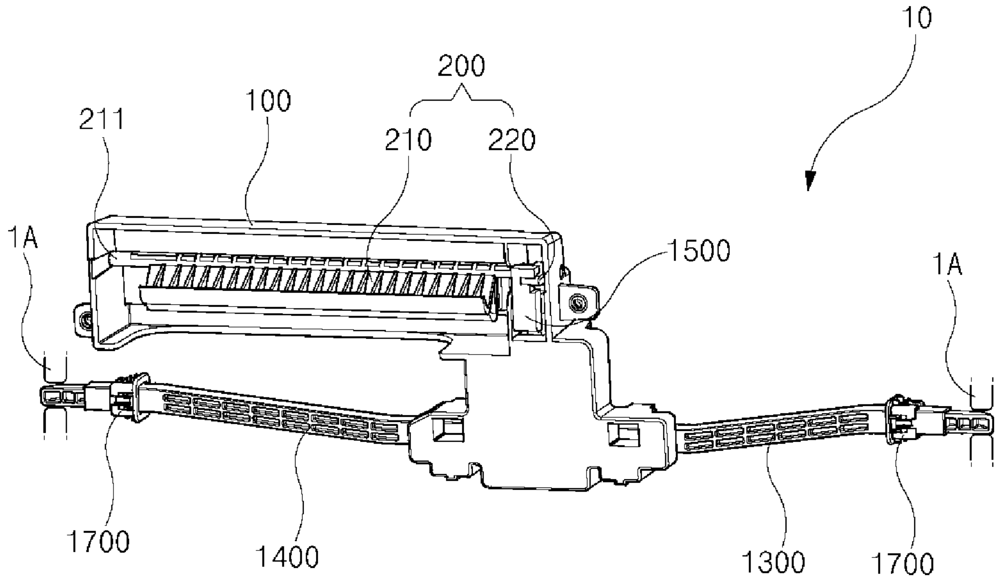
FIGS. 6 and 7 are views illustrating the closed state of the glove box by the opening and closing device for glove boxes according to another embodiment of the present disclosure.
Figure 7:
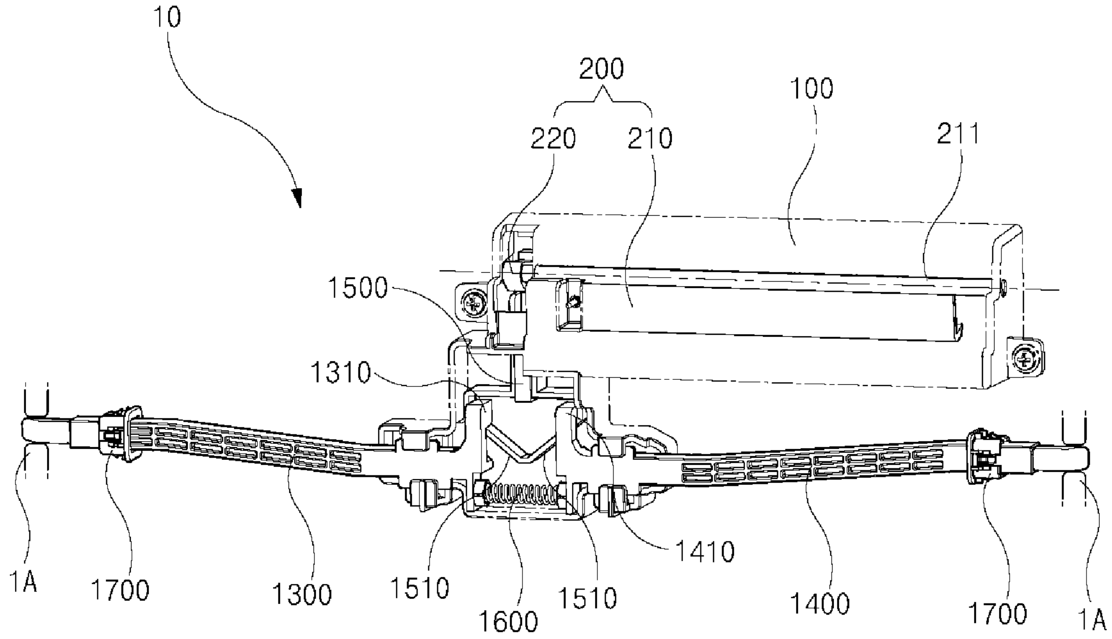

FIGS. 6 and 7 are views illustrating the closed state of the glove box 2 by the opening and closing device 10 for glove boxes according to another embodiment of the present disclosure. FIG. 6 is a view of the opening and closing device 10 for glove boxes, as seen from a cover 2B, and FIG. 7 is a view of the opening and closing device 10 for glove boxes, as seen from a body 2A.

Figure 8:
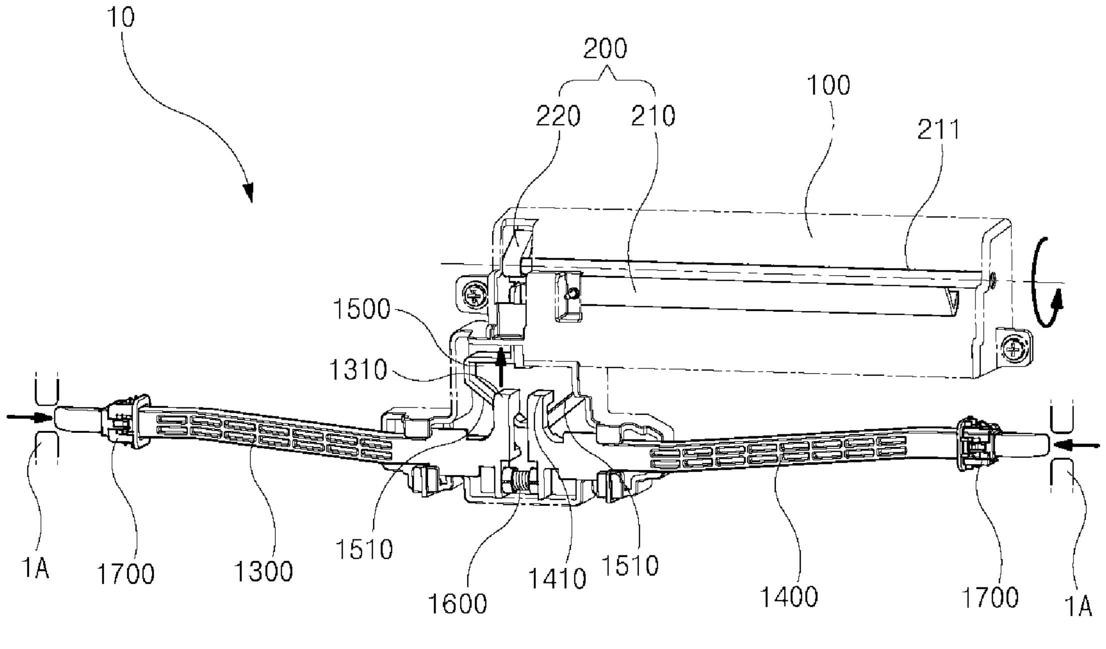
FIG. 8 is a view illustrating the open state of the glove box by the opening and closing device for glove boxes according to another embodiment of the present disclosure.

FIG. 8 is a view illustrating the open state of the glove box 2 by the opening and closing device 10 for glove boxes according to another embodiment of the present disclosure. FIG. 8 is a view of the opening and closing device 10 for glove boxes, as seen from the body 2A.

As shown in FIGS. 5 to 8, the opening and closing device 10 for glove boxes according to another embodiment of the present disclosure enables the glove box 2 to be maintained in a closed state in normal times and to be opened when a user pulls a handle 200.

The opening and closing device 10 for glove boxes according to another embodiment of the present disclosure includes a housing 100, the handle 200, a locking unit, a link rod 1500, an elastic member 1600 and guides 1700. More particularly, the locking unit may include a third locking rod 1300 and a fourth locking rod 1400. The third locking rod 1300 and the fourth locking rod 4000 are configured to move in the length direction, i.e., the width direction of the cover 2B, in the state of being interlocked with the link rod 1500.

As shown in FIG. 5, the glove box 2 includes the body 2A and the cover 2B. The opening and closing device 10 for glove boxes according to another embodiment of the present disclosure is provided between the body 2A and the cover 2B.

As show in FIG. 5, the body 2A forms a storage space 2S to store articles. Rails 2R are mounted on the side surfaces of the body 2A. The glove box 2 is mounted in the dashboard 1 of a vehicle so as to be slidable in the forward and rearward directions by the rails 2R.

The dashboard 1 of the vehicle may include a box installation part 1A. The box installation part 1A may form a space into which the glove box 2 is drawn. Although not shown in the figures, guide rails (not shown) on which the rails 2R are mounted so as to slidably move thereon may be installed in the box installation part 1A.

As shown in FIG. 5, the cover 2B is coupled to the front surface of the body 2A. The cover 2B may be coupled to the front surface of the body 2A using engagement structures, such as hooks, or by fastening using bolts. A handle groove 102 which is concave is formed in the cover 2B. A user may pull a rotating unit 210 forwards by putting his/her hand into the handle groove 102.

As shown in FIG. 5, the housing 100 is coupled with the rear surface of the cover 2B. The housing 100 may be coupled to the rear surface of the cover 2B using engagement structures, such as hooks, or by fastening using bolts.

As shown in FIGS. 5 to 8, the handle 200 is mounted on the housing 100 so as to be rotatable. The handle 200 includes the rotating unit 210 and a link unit 220.

A rotating shaft 211 is formed at the rotating unit 210. Holes, into which the rotating shaft 211 is rotatably inserted, may be formed through the housing 100.

The rotating unit 210 forms a part which is pulled by the user with his/her hand so as to open the glove box 2. When the user rotates the rotating unit 210 in one direction, the rotating unit 210 is rotated about the rotating shaft 211 from the state shown in FIG. 7 to the state shown in FIG. 8.

Hereinafter, for ease in understanding of the present disclosure, the state shown in FIG. 7 will be referred to as a closed state. Further, the state shown in FIG. 8 will be referred to as an open state.

The link unit 220 extends from one end of the rotating shaft 211 in the radial direction of the rotating shaft 211. The upper part of the link rod 500 is connected to one end of the link unit 220.

A groove may be formed in the upper part of the link rod 1500, and one end of the link unit 220 may be inserted into the groove in the link rod 1500. Alternatively, the link rod 1500 and the link unit 220 may be rotatably coupled to each other by a pin.

As shown in FIGS. 7 and 8, when the user rotates the rotating unit 210 in one direction, the link unit 220 is rotated about the rotating shaft 211 from the closed state to the open state. One end of the link unit 220 ascends in the height direction while being rotated from the closed state to the open state, and the link rod 1500 ascends in the state of being interlocked with the link unit 220.

A pair of inclined parts 1510 is formed at the lower part of the link rod 1500. Inclined planes are formed on the upper surfaces of the inclined parts 1510. The inclined planes are symmetrical to each other based on a vertical line that passes therebetween. As shown in FIGS. 6 to 8, the third locking rod 1300 and the fourth locking rod 1400 are mounted in the glove box 2 so as to be movable leftwards and rightwards.

Engaged parts are formed on both side surfaces, i.e., the left and right surfaces, of the box installation part 1A. The engaged parts mean parts with which, the left and right ends, i.e., the distal ends, of the third locking rod 1300 and the fourth locking rod 1400 are engaged in the forward and rearward directions. The engaged parts may be formed adjacent to the distal ends of the third locking rods 1300 and the fourth locking rods 1400, and may be provided as holes into which the distal ends of the first locking rod 300 and the second locking rod 400 are inserted.

As shown in FIGS. 6 and 7, the closed state means the state in which the left and right ends, i.e., the distal ends, of the third locking rod 1300 and the fourth locking rod 1400 are inserted into the engaged parts. As shown in FIG. 8, the open state means the state in which the left and right ends, i.e., the distal ends, of the third locking rod 1300 and the fourth locking rod 1400 are released from the engaged parts.

The guides 1700 are coupled to the front surface of the body 2A. The guides 1700 may be coupled to the front surface of the body 2A using engagement structures, such as hooks, or screw combination structures. A pair of guides 1700 is provided.

One guide 1700 has a hole through which the third locking rod 1300 passes. Therefore, one guide 1700 guides leftward and rightward movement of the third locking rod 1300 through the inner surface of the hole thereof.

The other guide 1700 has a hole through which the fourth locking rod 1400 passes. Therefore, the other guide 1700 guides leftward and rightward movement of the fourth locking rod 1400 through the inner surface of the hole thereof.

As shown in FIGS. 6 to 8, the link rod 1500 connects the handle 200 to the third locking rod 1300 and the fourth link rod 1400. The upper part of the link rod 1500 is connected to one end of the link unit 220.

When the user rotates the rotating unit 210 in one direction, the link unit 220 is rotated about the rotating shaft 211 from the closed state to the open state. One end of the link unit 220 ascends while being rotated from the closed state to the open state. Therefore, the link rod 1500 also ascends.

A pair of inclined parts 1510 is formed at the lower part of the link rod 1500. The inclined planes are formed on the upper surfaces of the inclined parts 1510. The inclined planes are symmetrical to each other based on the vertical line that passes therebetween. More particularly, the inclined planes are configured to have an upward inclination in both directions from the center of the link rod 1500, so as to move integrally in response to the movement of the link rod 1500 in the upward and downward directions.

Further, proximal ends 1310 and 1410 of the third locking rod 1300 and the fourth locking rod 1400 adjacent to each other (hereinafter referred to as "mounting parts") contact relatively high parts of the inclined planes of the inclined parts 1510. While the link rod 1510 ascends, the mounting parts 1310 and 1410 contacting the inclined planes are moved towards the center of the link rod 1500. More particularly, the inclined planes are configured to be coupled to the respective mounting parts 1310 and 1410, so that, as the link rod 1500 ascends, the third locking rod 1300 and the fourth locking rod 1400 are moved in directions approaching each other while the mounting parts 1310 and 1410 contact parts of the inclined planes having a relatively low height.

That is, as the link rod 1500 ascends, the third locking rod 1300 and the fourth locking rod 1400 are moved along the shape of the inclined planes so that the distal ends of the third locking rod 1300 and the fourth locking rod 1400 are released from the engaged parts. Therefore, when the link rod 1500 ascends, the mounting parts 1310 and 1410 approach each other while sliding on the inclined planes.

The elastic member 1600 is interposed between the third locking rod 1300 and the fourth locking rod 1400. The elastic member 600 may be provided as a compression spring. The elastic member 1600 applies force to the third locking rod 1300 and the fourth locking rod 1400 so that the distal ends of the third locking rod 1300 and the fourth locking rod 1400 are engaged with the engaged parts.

Therefore, when the user takes his/her hand off of the rotating unit 210, the third locking rod 1300 and the fourth locking rod 1400 are moved to the original positions thereof corresponding to the closed state by the restoring force of the elastic member 1600.

Figure 9A:
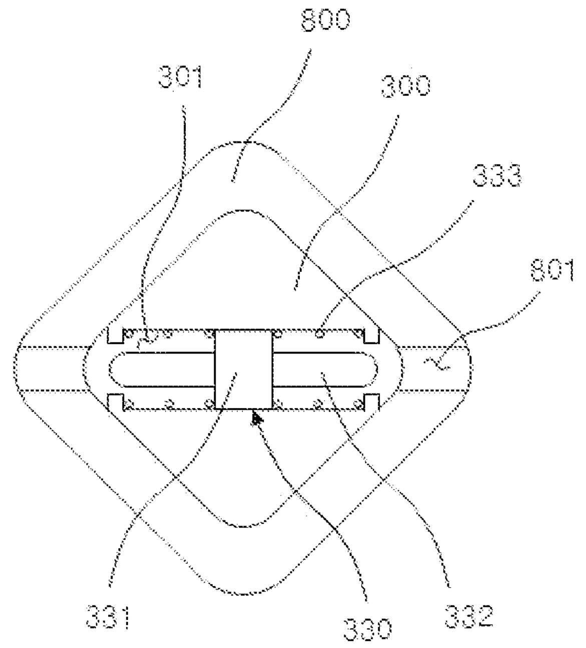
FIGS. 9A, 9B and 9C are cross-sectional views illustrating various states between a locking rod and a guide.
Figure 9B:
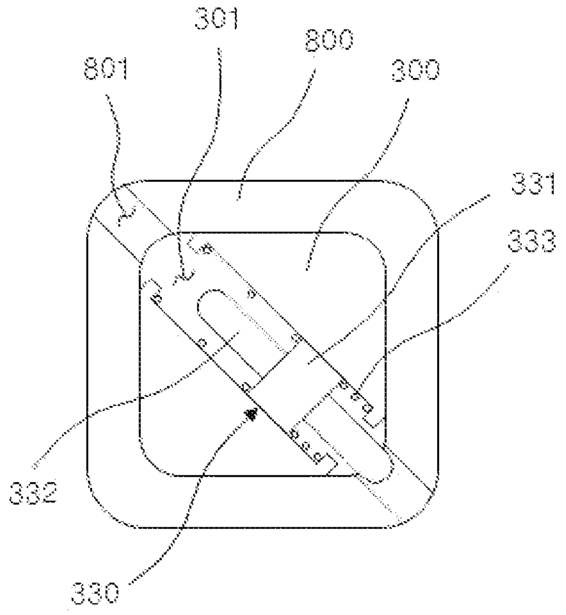
Figure 9C:
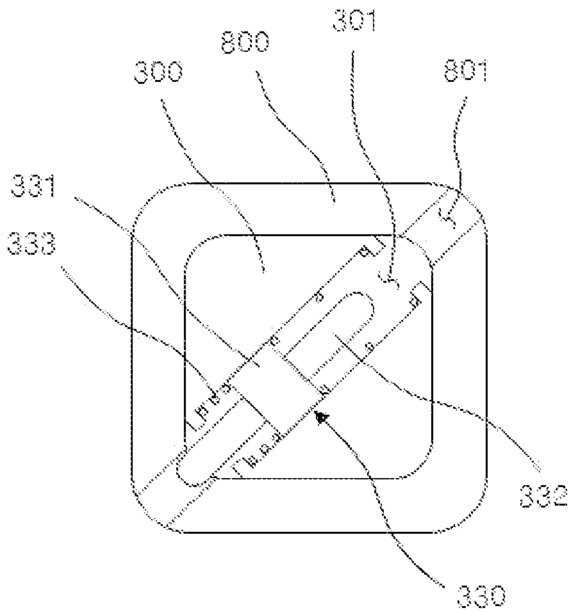

FIGS. 9A to 9C are cross-sectional views illustrating the first or third locking rod 300 or 1300 and the guide 700 or 1700 according to one embodiment or another embodiment of the present disclosure. FIG. 9A illustrates a state in which the vehicle is not inclined in the forward and rearward directions, and FIGS. 9B and 9C illustrate states in which the vehicle is inclined at an angle of 45° in the forward direction and in the rearward direction.

As shown in FIG. 9A, a through hole 301 may be formed through the first locking rod 300 or the third locking od 1300 in the forward and rearward direction, and a pin member 330 may be inserted into the through hole 301 so as to be slidably movable. The pin member 330 includes a sliding part 331 and a pair of insertion parts 332.

The sliding part 331 is slidably moved along the inner surface of the through hole 301. The sliding part 331 may be slidably moved along the inner surface of the through hole 301 due to gravity and inertial force.

A pair of insertion parts 332 extends from the sliding part 331 in the length direction of the through hole 301. The two insertion parts 332 extend in opposite directions. A pair of pin holes 801 into which the insertion parts 332 are inserted may be formed in the guide 700 or 1700.

A pair of elastic means 333 may be provided in the through hole 301. Steps are formed on the inner surface of the through hole 301. The elastic means 333 may be interposed between the steps and the sliding part 331. The elastic means 333 apply restoring force to the sliding parts 331 so that the insertion parts 332 are separated from the pin holes 801.

As shown in FIG. 9A, in the state in which the vehicle is not inclined in the forward and rearward directions, separation of the insertion parts 332 from the pin holes 801 may be maintained by the restoring force of the elastic means 333.

As shown in FIGS. 9B and 9C, in the state in which the vehicle is inclined at an angle of 45° in the forward or rearward direction, one of the insertion parts 332 is inserted into the pin hole 801 by gravity applied to the pin member 330. That is, in the state in which the vehicle is inclined at the angle of 45° in the forward or rearward direction, the load of the pin member 330 is greater than the restoring force of the elastic member 323. Therefore, insertion of one of the insertion parts 332 into the pin hole 801 is maintained.

When impact is applied to the vehicle, the vehicle may be severely inclined in the forward or rearward direction. Therefore, the glove box 2 may unintentionally be drawn out due to impact applied to the vehicle, and the unintentionally drawn-out glove box 2 may apply impact to a passenger seated on the passenger seat. Further, the glove box 2 may unintentionally obstruct escape of the passenger.

As show in FIGS. 9B and 9C, when the vehicle is severely inclined based on an axis thereof in the leftward and rightward directions, i.e., in the lateral direction, the pin member 330 is slid due to gravity and inserted into a corresponding one of the pin holes 801. Therefore, the movement of the third locking rod 1300 in the leftward and rightward directions is prevented. Therefore, when impact is applied to the vehicle, unintentionally drawing-out of the glove box 2 is prevented.

Great inertial force may be applied due to sudden braking of the vehicle prior to the crash or collision of the vehicle. Therefore, the insertion parts 332 may be inserted into a pair of pin holes 801 by inertial force in response to sudden stop or sudden braking of the vehicle. Thereby, unintentionally drawing-out of the glove box 2 is blocked in advance.

According to the present disclosure, there is provided the opening and closing device 10 for glove boxes, which enables the glove box 2 to be maintained in a closed state in normal times and to be immediately opened, because the distal ends of the third locking rod 1300 and the fourth locking rod 1400 are released from the engaged parts of the dashboard 1, when the user pulls the handle 200, reduces the thickness of the front surface of the glove box 2, and minimizes noise generation.

As is apparent from the above description, the present disclosure provides an opening and closing device for glove boxes which enables a glove box to be maintained in a closed state in normal times and to be opened because a locking unit is immediately released from engaged parts when a user pulls a handle, reduces the thickness of the front surface of the glove box, and minimizes noise generation.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. An opening and closing device for opening and closing a glove box, the opening and closing device comprising:
- a housing coupled to the glove box;
- a handle rotatably mounted on the housing;
- a locking unit mounted so as to be movable in directions of releasing the glove box from a dashboard of a vehicle; and
- a link rod configured to connect the handle and the locking unit to each other and to move in a height direction of the locking unit when a user rotates the handle,
- wherein a pair of inclined parts are formed at the lower part of the link rod,
- wherein the locking unit is movable in a length direction of the locking unit in a state of being interlocked with the link rod so that the locking unit is released from at least one engaged part of the dashboard, and
- wherein, as the link rod ascends, the pair of inclined parts also ascend, and mounting parts of locking rods of the locking unit move toward each other along inclined planes of the pair of inclined parts.

2. The opening and closing device for glove boxes of claim 1, wherein the handle comprises:
- a rotating unit configured to rotate about a rotating shaft; and
- a link unit extending from the rotating shaft in a radial direction of the rotating shaft and connected to the link rod.

3. The opening and closing device for glove boxes of claim 1, wherein the locking unit comprises a first locking rod and a second locking rod,
- wherein the first locking rod comprises an inclined part located at a position of the first locking rod, which corresponds to the at least one engaged part, and is configured such that the first locking rod moves in the length direction of the locking unit in response to an upward or downward movement of the link rod.

4. The opening and closing device for glove boxes of claim 3, wherein:
- the first locking rod is mounted on the glove box so as to be movable leftwards and rightwards and comprises a first rack part; and
- the second locking rod is mounted on the glove box so as to be movable leftwards and rightwards and comprises a second rack part,
- wherein the locking unit further comprises a pinion engaged with the first rack part and the second rack part so as to move the first locking rod and the second locking rod towards opposite sides in the length direction of the locking unit.

5. The opening and closing device for glove boxes of claim 1, wherein the locking rods of the locking unit comprise a third locking rod and a fourth locking rod, and
- wherein an elastic member is located between proximal ends of the third locking rod and the fourth locking rod and configured to engage distal ends of the third locking rod and the fourth locking rod with the at least one engaged part of the dashboard.

6. The opening and closing device for glove boxes of claim 5, wherein:
- a pair of inclined parts is disposed at a part of the link rod where the third locking rod and the fourth locking rod face each other; and
- the third locking rod and the fourth locking rod are movable along inclined planes of the pair of inclined parts in directions, in which the proximal ends of the third locking rod and the fourth locking rod approach each other, in response to an upward or downward movement of the link rod so that the distal ends of the third locking rod and the fourth locking rod are respectively separated from the at least one engaged part of the dashboard.

7. The opening and closing device for glove boxes of claim 1, further comprising a guide mounted on the glove box such that the locking unit passes through the guide, wherein the guide guides movement of the locking unit in the length direction.

8. The opening and closing device for glove boxes of claim 1, further comprising an elastic member configured to apply force to the locking unit so that the locking unit is engaged with the at least one engaged part of the dashboard.

9. An opening and closing device for opening and closing a glove box, the opening and closing device comprising:

a housing coupled the glove box;

a handle rotatably mounted on the housing;

a locking unit mounted so as to be movable in directions of releasing the glove box from board of a vehicle;

a link rod configured to connect the handle and the locking unit to each other and to move in a height direction of the locking unit when a user rotates the handle;

a guide mounted on the glove box such that the locking unit passes through the guide;

a through hole extending through the locking unit in a length direction of the locking unit;

a pin member inserted into the through hole so as to be slidably movable; and pin holes formed in the guide such that the pin member is inserted thereinto, wherein the locking unit is movable in the length direction of the locking unit in a state of being interlocked with the link rod so that the locking unit is released from engaged parts of the dashboard, wherein the guide guides movement of the locking unit in the length direction of the locking unit, and wherein, when the vehicle is inclined based on an axis thereof in leftward and rightward directions, the pin member is slidably movable along the through hole and inserted into a corresponding one of the pin holes.

* * * * *